United States Patent
Iwaki

(10) Patent No.: US 7,453,521 B2
(45) Date of Patent: Nov. 18, 2008

(54) INFORMATION PROCESSING APPARATUS AND DISPLAY CONTROL METHOD

(75) Inventor: Tsutomu Iwaki, Hannou (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 592 days.

(21) Appl. No.: 11/239,226

(22) Filed: Sep. 30, 2005

(65) Prior Publication Data

US 2006/0066639 A1   Mar. 30, 2006

(30) Foreign Application Priority Data

Sep. 30, 2004   (JP) ............................. 2004-287500

(51) Int. Cl.
*H04N 9/74*   (2006.01)
(52) U.S. Cl. ...................... 348/581; 348/561
(58) Field of Classification Search ................. 348/581, 348/582, 561, 562, 554–558; 345/660, 670, 345/671; 382/298–300; *H04N 9/74, 5/46, H04N 3/27*
See application file for complete search history.

(56) References Cited

U.S. PATENT DOCUMENTS

| | | | | |
|---|---|---|---|---|
| 5,943,064 A | | 8/1999 | Hong | |
| 6,002,446 A | * | 12/1999 | Eglit | 348/581 |
| 6,108,047 A | * | 8/2000 | Chen | 348/581 |
| 6,798,420 B1 | | 9/2004 | Xie | |
| 2002/0122046 A1 | | 9/2002 | Dischert et al. | |
| 2002/0145610 A1 | | 10/2002 | Barilovits et al. | |
| 2003/0038823 A1 | | 2/2003 | Pasqualini et al. | |

FOREIGN PATENT DOCUMENTS

EP   0 653 742 A2   10/1994
JP   2000-148128   5/2000

* cited by examiner

*Primary Examiner*—Sherrie Hsia
(74) *Attorney, Agent, or Firm*—Pillsbury Winthrop Shaw Pittman LLP

(57) ABSTRACT

When the fact that the display mode of motion picture data is a full screen mode is detected, the display control mode for sending a video signal generated by a graphics controller to an LCD is switched from a normal mode for sending the video signal to the LCD without interposition of a high quality video engine to a high quality mode for sending the video signal to the LCD with interposition of the high quality video engine. The high quality video engine enlarges the screen size of the video signal in either linear scaling mode or nonlinear scaling mode designated by a user. Scaling is validated only in the case were motion picture data are displayed in the full screen mode.

13 Claims, 10 Drawing Sheets

LINEAR SCALING
16:9 SOURCE

LINEAR SCALING
4:3 SOURCE

4:3 SOURCE
UNIFORM ENLARGEMENT

NONLINEAR SCALING
4:3 SOURCE

INFORMATION PROCESSING APPARATUS AND DISPLAY CONTROL METHOD

CROSS-REFERENCE TO RELATED APPLICATIONS

This application is based upon and claims the benefit of priority from the prior Japanese Patent Application No. 2004-287500, filed on Sep. 30, 2005; the entire contents of which are incorporated herein be reference.

BACKGROUND

1. Field

The present invention relates to an information processing apparatus which can display motion picture data on a display device, and a display control method used in this apparatus.

2. Description of the Related Art

Generally, scaling techniques are used in TV apparatuses to display a video source with an aspect ratio of 4:3 on a wide screen with an aspect ratio of 16:9. Nonlinear scaling is known as one of the scaling techniques (e.g. see JP-A-2000-148128).

Use of nonlinear scaling permits the video source to be displayed on the whole wide screen without horizontal enlargement of image of the center portion of the video source.

Generally, in most cases, an image in the center portion of the screen is significant in motion pictures. Therefore, nonlinear scaling is a technique which is effective in enlarging the motion pictures.

A personal computer having an AV playback function equivalent to that of an audio/video (AV) apparatus such as a DVD (Digital Versatile Disc) player or a TV apparatus has been developed recently. Therefore, nonlinear scaling is adapted to the case where motion pictures are displayed on a display device of the personal computer.

BRIEF SUMMARY OF THE INVENTION

In the computer, however, a still image such as a text image or a graphics image as well as motion picture data must be displayed. In the still image, the significance of any image portion on the screen is equal. Accordingly, if nonlinear scaling is often used in the computer, there is a possibility that visibility of the still image will be lowered extremely.

It is an object of the invention to provide an information processing apparatus and a display control method in which motion pictures can be displayed in a display format corresponding to user's preference without lowering of visibility of a still image.

DETAILED DESCRIPTION

An embodiment of the invention will be described below with reference to the drawings.

First, the configuration of an information processing apparatus according to an embodiment of the invention will be described with reference to FIGS. 1 and 2. For example, the information processing apparatus is implemented as a notebook type personal computer 10.

Figure 1:
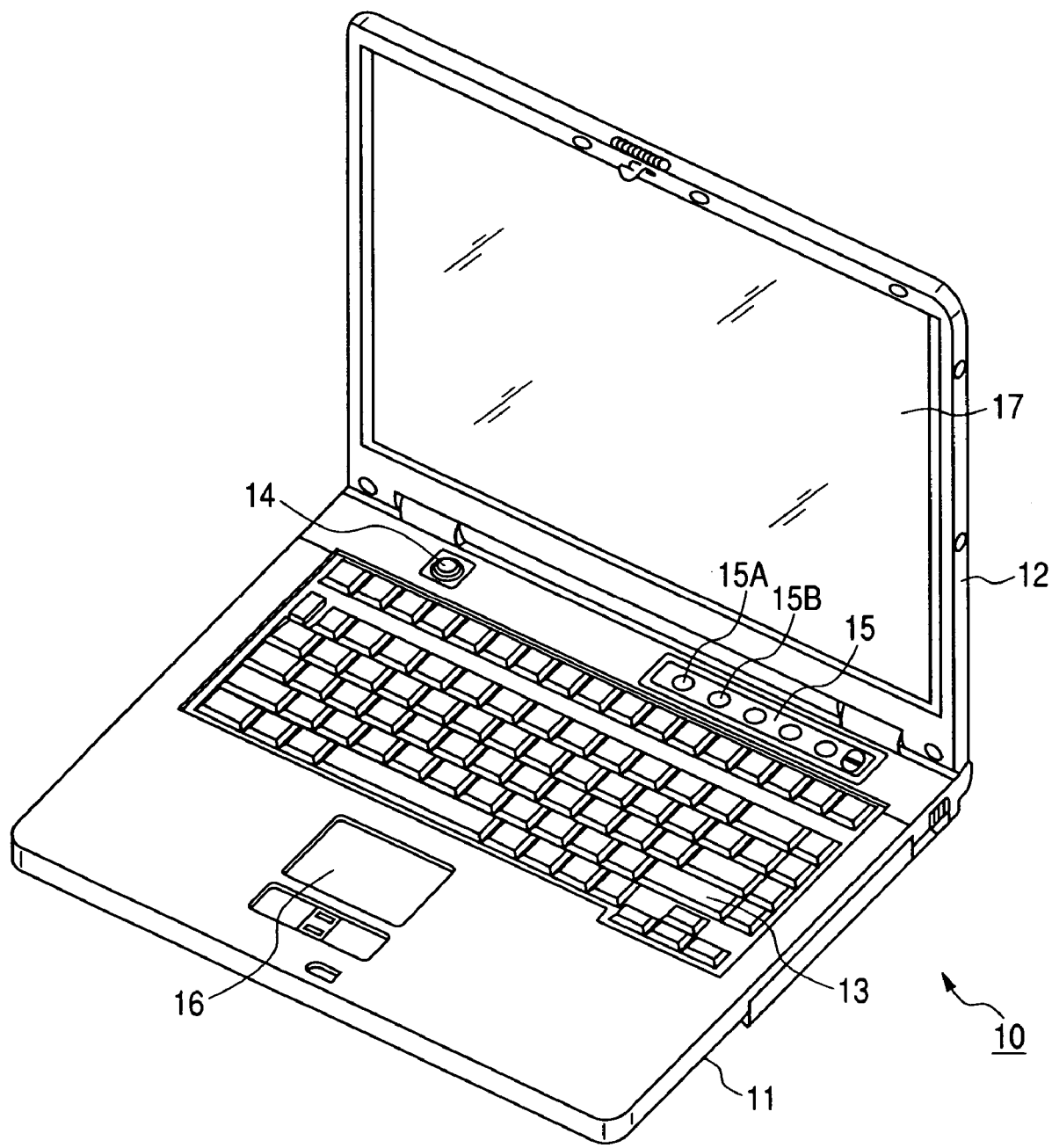
FIG. 1 is a perspective view showing an external appearance of a computer according to an embodiment of the invention.

FIG. 1 is a front view of a notebook type personal computer 10 in a state in which a display unit of the computer 10 is opened. The computer 10 comprises a computer body 11, and a display unit 12. A display device made of an LCD (Liquid Crystal Display) 17 is incorporated in the display unit 12. A display screen of the LCD 17 is substantially located in the center of the display unit 12. The LCD 17 has a wide display screen which is long sideways. For example, the resolution of the LCD 17 is 1280 by 800.

The display unit 12 is attached to the computer body 11 so that the display unit 12 can rotate freely between an open position and a close position. The computer body 11 has a thin box-shaped casing. A keyboard 13, a power button 14 for powering on/off the computer 10, an input operation panel 15, a touch pad 16 and so on are disposed in an upper surface of the casing.

The input operation panel 15 is an input device for inputting an event corresponding to a pushed button. The input operation panel 15 has buttons for operating functions respectively. The group of buttons includes a TV start button 15A, and a DVD/CD start button 15B. The TV start button 15A is a button for playing back TV broadcast program data. When the TV start button 15A is pushed down by a user, an application program for playing back TV broadcast program data is operated automatically. The DVD/CD start button 15B is a button for playing back video contents recorded on a DVD or CD. When the DVD/CD start button 15B is pushed down by the user, an application program for playing back video contents is operated automatically.

In the computer 10 according to this embodiment, a scaling function is provided for displaying motion picture data such as TV broadcast program data or video contents on the LCD 17 in a full screen mode.

Next, the system configuration of the computer 10 will be described with reference to FIG. 2.

Figure 2:
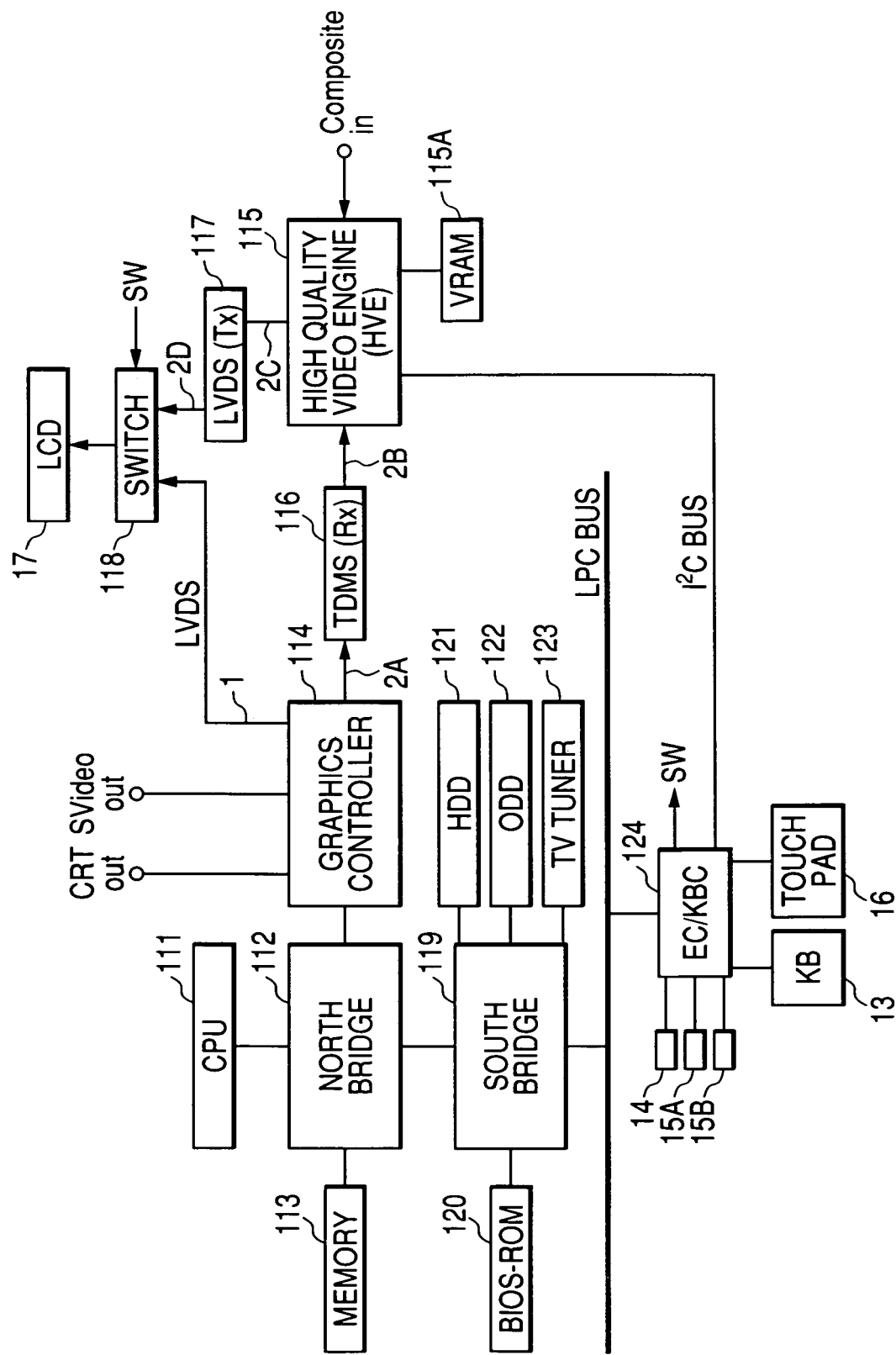
FIG. 2 is a block diagram showing the system configuration of the computer depicted in FIG. 1.

As shown in FIG. 2, the computer 10 comprises a CPU 111, a north bridge 112, a main memory 113, a graphics controller 114, a high quality video engine (HVE) 115, a TMDS (Rx) processing portion 116, an LVDS (Tx) processing portion 117, a switch 118, a south bridge 119, a BIOS-ROM 120, a hard disk drive (HDD) 121, an optical disk drive (ODD) 122, a TV tuner 123, and an embedded controller/keyboard controller IC (EC/KBC) 124.

The CPU 111 is a processor provided for controlling the operation of the computer 10. An operating system (OS) and various kinds of application programs loaded from the hard disk device (HDD) 121 onto the main memory 113 are executed by the CPU 111. The OS has a window system for displaying widows on the display screen.

Motion picture data (such as TV broadcast program data received by the TV tuner 123 or video contents stored in a storage medium such as a DVD) are generally displayed in a window corresponding to a video playback application program for playing back the motion picture data. In this case, for example, a window corresponding to the video playback application program is disposed on a desk-top screen so that motion picture data are displayed in the window (window mode). The computer 10 is also configured so that motion picture data can be displayed on the display screen of the LCD 17 in a full screen mode. In the full screen mode, only motion picture data are substantially displayed on the whole area of the display screen. In this case, there is substantially no display of the desk-top screen and windows corresponding to other application programs than the video playback application program. There is also no display of a menu bar etc. of a window corresponding to the video playback application program. That is, only motion picture data are substantially displayed on the whole area of the display screen.

The CPU 111 also executes a system BIOS (Basic Input Output System) stored in the BIOS-ROM 120. The system BIOS is a program for hardware control.

The north bridge 112 is a bridge device for connecting a local bus of the CPU 111 and the south bridge 119 to each other. The north bridge 112 includes a memory controller for access control of the main memory 113. The north bridge 112 has a function for communicating with the graphics controller 114 via an AGP (Accelerated Graphics Port) bus or the like.

The graphics controller 114 is a display controller for controlling the LCD 17 used as a display monitor for the computer 10. The graphics controller 114 has a video memory (VRAM), so that a video signal to form a display image to be displayed on the LCD 17 is generated from display data drawn on the video memory by the OS/application program. The display image to be displayed on the LCD 17 is generally made of an image of the desk-top screen and images of windows disposed on the desk-top screen. When motion picture data are displayed in a full screen mode, the display image to be displayed on the LCD 17 is however composed of only images of motion picture data. Accordingly, when motion picture data are displayed in a full screen mode, video signals to form only display images of the motion picture data are output from the graphics controller 114.

The video signals generated by the graphics controller 114 are supplied to lines 1 and 2A respectively. For example, the video signal supplied to the line 1 is an 18-bit signal of an LVDS (Low Voltage Differential Signaling) format whereas the video signal supplied to the line 2A is a 24-bit signal of a TMDS (Transition Minimized Differential Signaling) format. The graphics controller 114 further has an interface for supplying an analog video signal to an external CRT (Cathode Ray Tube), and an interface for supplying an analog video signal to the outside via an S video terminal.

The TMDS (Rx) processing portion 116 converts the TMDS-format 24-bit signal received from the graphics controller 114 via the line 2A into a 24-bit RGB digital signal and sends the 24-bit RGB digital signal to the high quality video engine (HVE) 115 via a line 2B.

The high quality video engine (HVE) 115 is a video processing controller which executes video processing (hereinafter referred to as quality correcting process) for improving the quality of the video signal generated by the graphics controller 114. The high quality video engine (HVE) 115 has a video memory (VRAM) 115A. The quality correcting process is executed on the video memory (VRAM) 115A. The quality correcting process is video processing which is for the exclusive use of motion pictures to improve the quality of motion pictures and which is executed to display smooth and high-quality motion pictures on the LCD 17. In the quality correcting process, for example, color correction (gamma correction, white balance adjustment, brightness adjustment, contrast adjustment), sharpness adjustment, edge enhancement, LCD response speed enhancement, etc. are performed to improve the quality of motion pictures.

The high quality video engine (HVE) 115 can apply the quality correcting process to a video signal given from an external video apparatus via a composite input terminal.

The high quality video engine (HVE) 115 further has a scaling function for enlarging (or stretching) the screen size (resolution) of the video signal. The scaling function supports nonlinear scaling, so that each of regions set on a video source can be enlarged in an arbitrary horizontal enlargement ratio. Scaling of the video signal is executed after the quality correcting process of the video signal is executed. Motion pictures can be displayed with higher quality in the case where the video signal is scaled after raw data not scaled yet is subjected to the quality correcting process compared with the case where the video signal is subjected to the quality correcting process after scaling.

The video signal processed by the high quality video engine (HVE) 115 is sent to the LVDS (Tx) processing portion 117 via a line 2C. The LVDS (Tx) processing portion 117 converts the RGB digital signal output from the high quality video engine (HVE) 115 into a signal of an LVDS (Low Voltage Differential Signaling) format and supplies the LVDS-format signal onto a line 2D.

The switch 118 serves as a selector for selectively supplying either the video signal generated by the graphics controller 114 or the video signal processed by the high quality video engine (HVE) 115 to the LCD 17. The switch 118 has a first input terminal connected to the line 1, a second input terminal connected to the line 2D, and an output terminal connected to the LCD 17. The switch 118 is formed so that either the first input terminal or the second input terminal is selected in accordance with a switch control signal SW given from the EC/KBC 124 so that the selected input terminal is connected to the output terminal. In this embodiment, the following two display control modes can be used by the action of the switch 118.

(1) Normal Mode:

In the normal mode, the video signal given from the graphics controller 114 is sent to the LCD 17 without interposition of the high quality video engine (HVE) 115. The normal mode is used when some still image is contained in display mages displayed on the LCD 17. In the normal mode, motion picture data are displayed in a window mode.

(2) High Quantity Mode:

In the high quality mode, the video signal given from the graphics controller 114 is sent to the LCD 17 with interposition of the high quality video engine (HVE) 115. The high quality mode is used when motion picture data are displayed on the LCD 17 in a full screen mode. If the quality correcting process prepared for motion pictures is applied to a still image (such as a desk-top screen, an operation screen of a word processor software or an operation screen of a spreadsheet software), sharpness becomes so high that visibility of the still image is lowered. In the high quality mode, the video signal is scaled automatically in either nonlinear scaling mode or linear scaling mode. The user can preset use of either nonlinear scaling mode or linear scaling mode through a GUI provided by a video control utility program. The video control utility program is a program for controlling the quality correcting process and the scaling process of the high quality video engine (HVE) 115.

The south bridge 119 controls respective devices on an LPC (Low Pin Count) bus. The south bridge 119 includes an IDE (Integrated Drive Electronics) controller for controlling the HDD 121 and the ODD 122. The south bridge 119 has a function for controlling the TV tuner 123, and a function for access control of the BIOS-ROM 120.

The optical disk drive (ODD) 123 is a drive unit for driving a storage medium such as a DVD or a CD containing video contents. The TV tuner 123 is a receiver for receiving broadcast program data such as a TV broadcast program.

The embedded controller/keyboard controller IC (EC/KBC) 124 is a one-chip microcomputer into which an embedded controller for power management and a keyboard controller for controlling the keyboard (KB) 13 and the touch pad 16 are integrated. The embedded controller/keyboard controller IC (EC/KBC) 124 has a function for powering on/off the computer 10 in accordance with the user's operation on the power button 14.

The embedded controller/keyboard controller IC (EC/KBC) 124 further has a function for communicating with the high quality video engine (HVE) 115 through an I²C bus, and a function for supplying the switch control signal SW to the switch 118.

Next, an example of configuration of the high quality video engine (HVE) 115 will be described with reference to FIG. 3.

Figure 3:
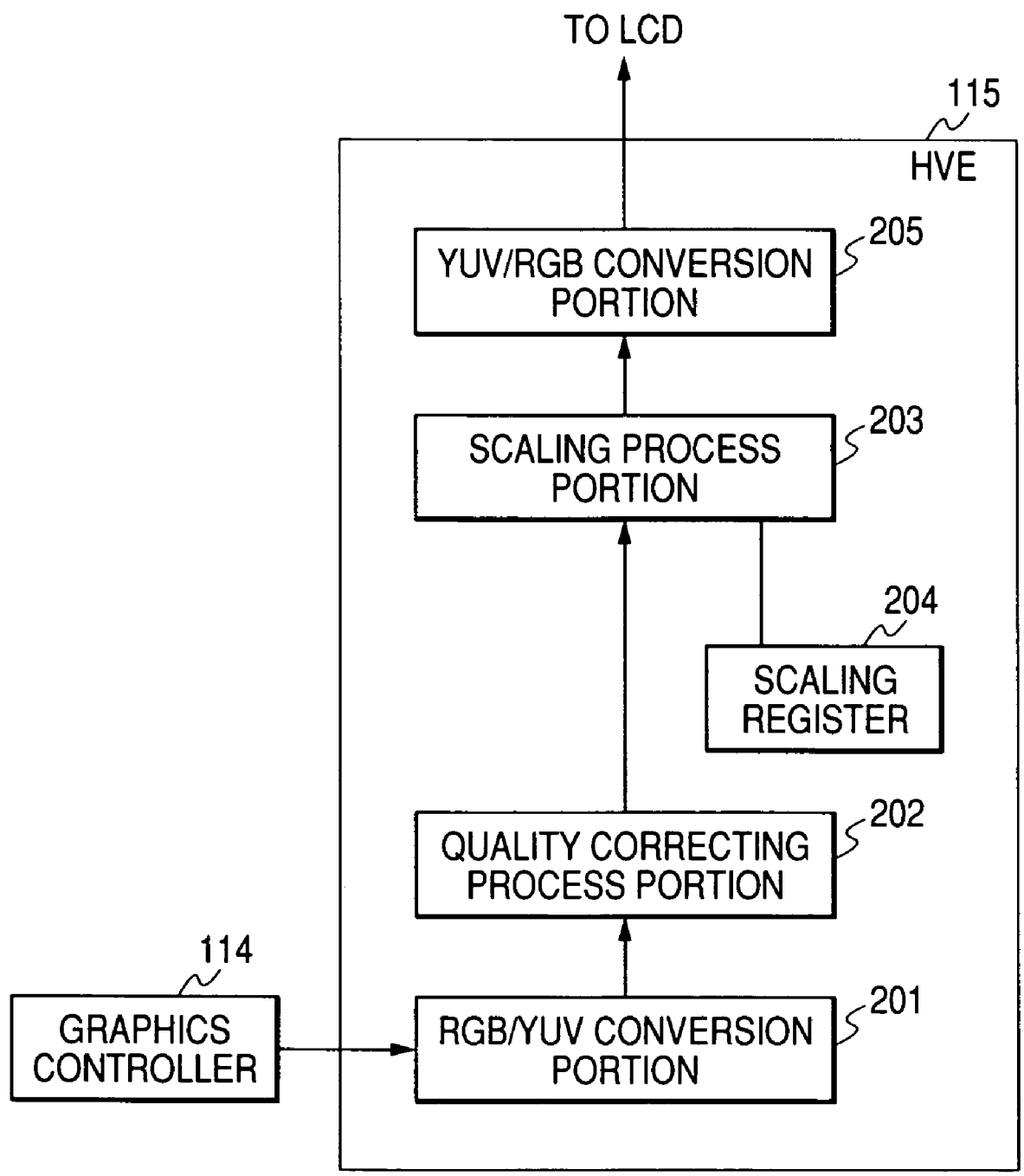
FIG. 3 is a block diagram showing the configuration of a high quality video engine provided in the computer depicted in FIG. 1.

As shown in FIG. 3, the high quality video engine (HVE) 115 has an RGB/YUV conversion portion 201, a quality correcting process portion 202, a scaling process portion 203, a scaling register 204, and a YUV/RGB conversion portion 205.

The RGB/YUV conversion portion 201 operates so that the video signal given from the graphics controller 114 through the TMDS (Rx) processing portion 116 is converted from the RGB signal into a YUV signal. The quality correcting process portion 202 applies an arithmetic process to the YUV signal to perform quality correction (such as color correction (gamma correction, white balance adjustment, brightness adjustment, contrast adjustment), sharpness adjustment, edge enhancement and response speed enhancement) of the YUV signal. The scaling process portion 203 scales the quality-corrected YUV signal in either linear scaling mode or nonlinear scaling mode in accordance with scaling parameter information set in the scaling register 204.

Scaling is a process for enlarging the screen size (resolution) of the video signal. By the scaling process, the screen size (resolution) of motion picture data is automatically enlarged to a size adapted to the size (panel resolution) of the display screen of the LCD 17 so that motion picture data can be displayed on the LCD 17 in a full screen mode. In the linear scaling mode, the screen size of motion picture data is enlarged while the aspect ratio of the motion picture data is kept constant. On the other hand, in the nonlinear scaling mode, horizontal enlargement ratios, for example, different between the center region of the motion picture data and the peripheral region of the motion picture data are used. Accordingly, in the nonlinear scaling mode, the motion picture data can be displayed on the whole screen of the LCD 17 without horizontal enlargement of image in the center portion of the motion picture data.

The YUV/RGB conversion portion 205 converts the scaled video signal from the 24-bit YUV signal into a 18-bit RGB signal. The RGB signal is sent to the LVDS (Tx) processing portion 117 via the line 2C.

Figure 4:
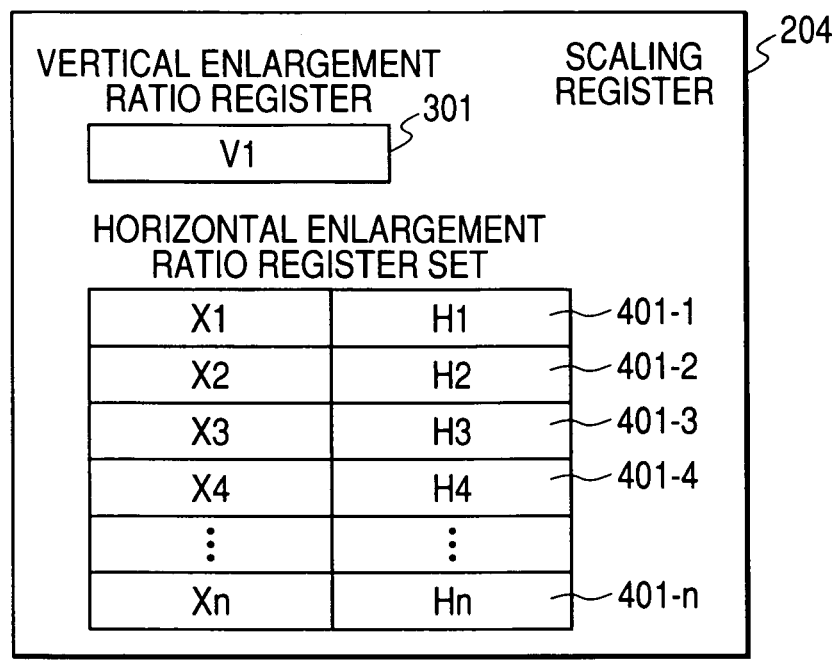
FIG. 4 is a view showing an example of configuration of a scaling register provided in the high quality video engine depicted in FIG. 3.

Next, an example of configuration of the scaling register 204 will be described with reference to FIG. 4.

Figure 5:
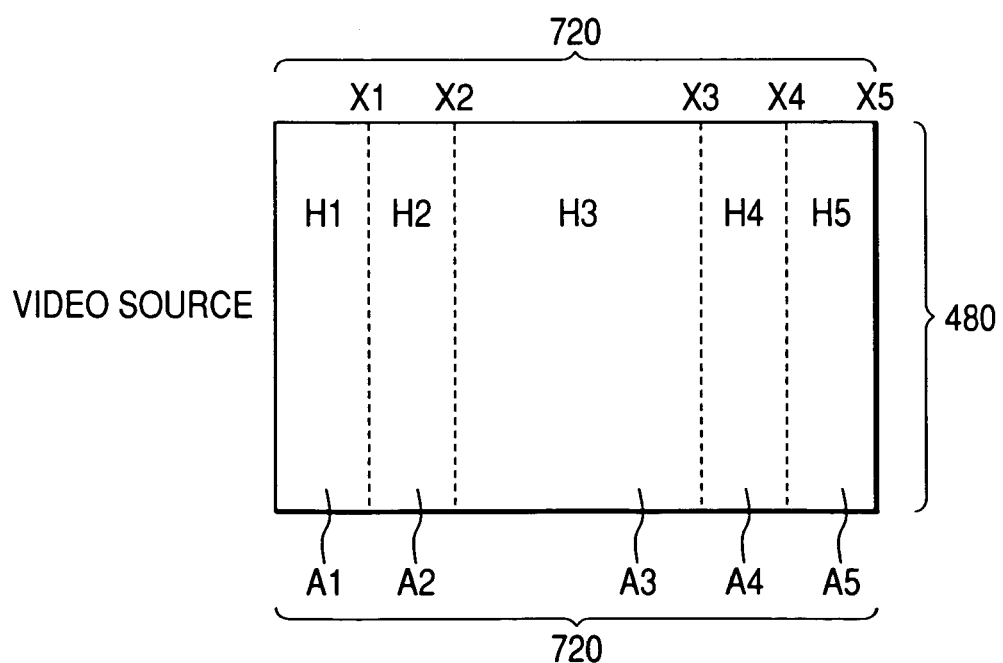
FIG. 5 is a view for explaining nonlinear scaling executed by the high quality video engine depicted in FIG. 3.

The scaling register 204 has a vertical enlargement ratio register 301, and a number n (e.g. n=7) of horizontal enlargement ratio registers 401-1 to 401-n. The vertical enlargement ratio register 301 is a register for designating a vertical enlargement ratio ($V_1$) with respect to the video source. The horizontal enlargement ratio registers 401-1 to 401-n are a register set for designating horizontal enlargement ratios ($H_1$ to $H_n$) with respect to $\underline{n}$ regions obtained by dividing the video source. These horizontal enlargement ratio registers 401-1 to 401-n can hold $\underline{n}$ combinations of $X_i$ and $H_i$. As shown in FIG. 5, $X_i$ designates a horizontal pixel number in the video source (e.g. 720×480) and $H_i$ designates a horizontal enlargement ratio in a region between $X_{i-1}$ and $X_i$. FIG. 5 corresponds to the case of n=5. In FIG. 5, the video source is separated into five regions $A_1$ to $A_5$. Te horizontal size of each region $A_i$ is decided on the basis of the difference between $X_i$ and $X_{i-1}$. In the linear scaling mode, the horizontal enlargement ratios $H_1$ to $H_5$ are set to be equal to one another. On the other hand, in the linear scaling mode, $H_3$ corresponding to the center region $A_3$ is set to be equal to $V_1$ but $H_1$, $H_2$, $H_4$ and $H_5$ are decided so that the enlarged horizontal size of the video source coincides with the horizontal size of the LCD 17.

Figure 6:
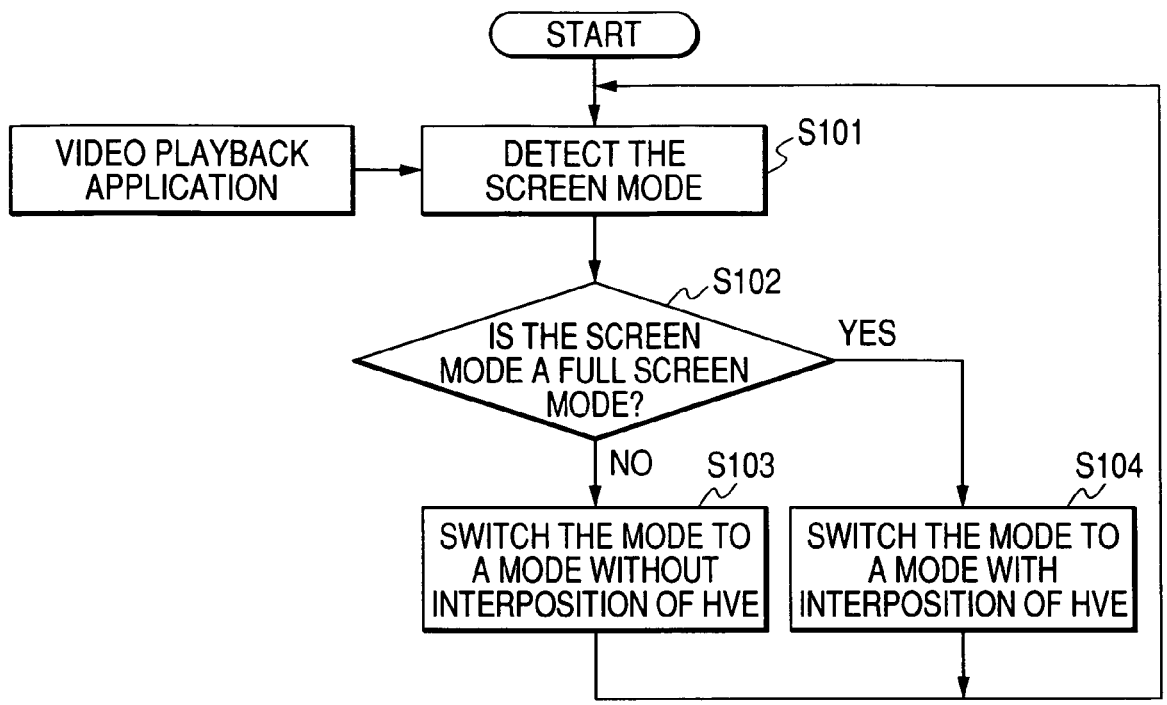
FIG. 6 is a flow chart showing the procedure of a display control process executed in the computer depicted in FIG. 1.

Next, the display control process executed by the computer 10 will be described with reference to FIG. 6 which is a flow chart.

The CPU 111 judges whether the current display mode for displaying motion picture data is a full screen mode or not, for example, in accordance with the presence/absence of a full screen mode request given from the video playback application program for playing back the motion picture data (step S101). In this case, the CPU 111 responds to the issue of a full screen mode request from the video playback application program, for example, to a display driver and decides that the current display mode for displaying motion picture data is a full screen mode. The display driver is a program for controlling the graphics controller 114.

If the current display mode for displaying motion picture data is not a full screen mode (NO in step S102), the CPU 111 operates so that the display control mode for sending the video signal from the graphics controller 114 to the LCD 17 is switched to a mode (normal mode) for sending the video signal to the LCD 17 without interposition of the high quality video engine (HVE) 115 (step S103). On the other hand, if the current display mode for displaying motion picture data is a full screen mode (YES in step S102), the CPU 111 operates so that the display control mode is switched to a mode (high quality mode) for sending the video signal to the LCD 17 with interposition of the high quality video engine (HVE) 115 (step S103).

When a full screen mode cancel request is issued from the video playback application program in the high quality mode, the CPU 111 executes a process for switching the display control mode from the high quality mode to the normal mode.

Next, user interfaces used in the computer 10 will be described with reference to FIG. 7.

Figure 7:
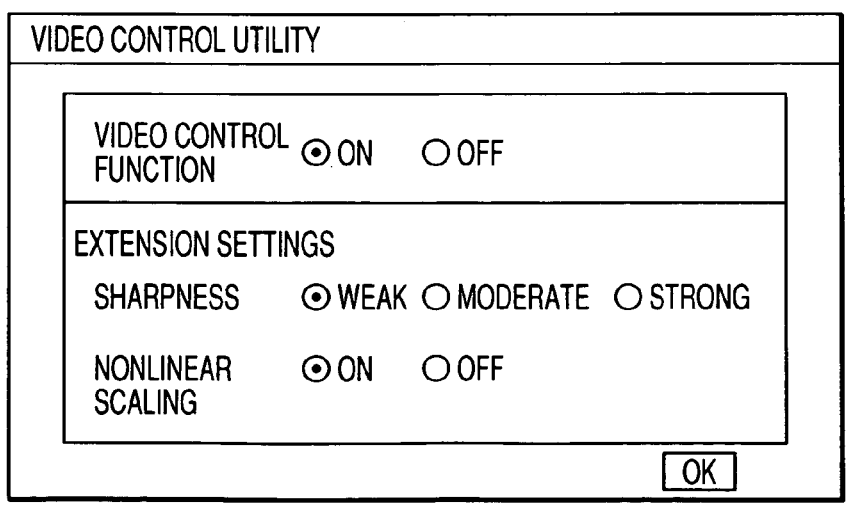
FIG. 7 is a view showing an example of user interface used in the computer depicted in FIG. 1.

FIG. 7 shows an example of a setting screen displayed by the video control utility. The setting screen is a screen through which the user can set quality control before motion picture display. The user can designate the validity/invalidity of the video control function (high quality mode), the strength of sharpness and the validity/invalidity of nonlinear scaling. The strength of sharpness and the validity/invalidity of nonlinear scaling can be set only in the case where the video control function (high quality mode) is valid. When nonlinear scaling is valid, the high quality video engine (HVE) 115 enlarges motion picture data in a nonlinear scaling mode. On the other hand, when nonlinear scaling is invalid, the high quality video engine (HVE) 115 enlarges motion picture data in a linear scaling mode.

Figure 8:
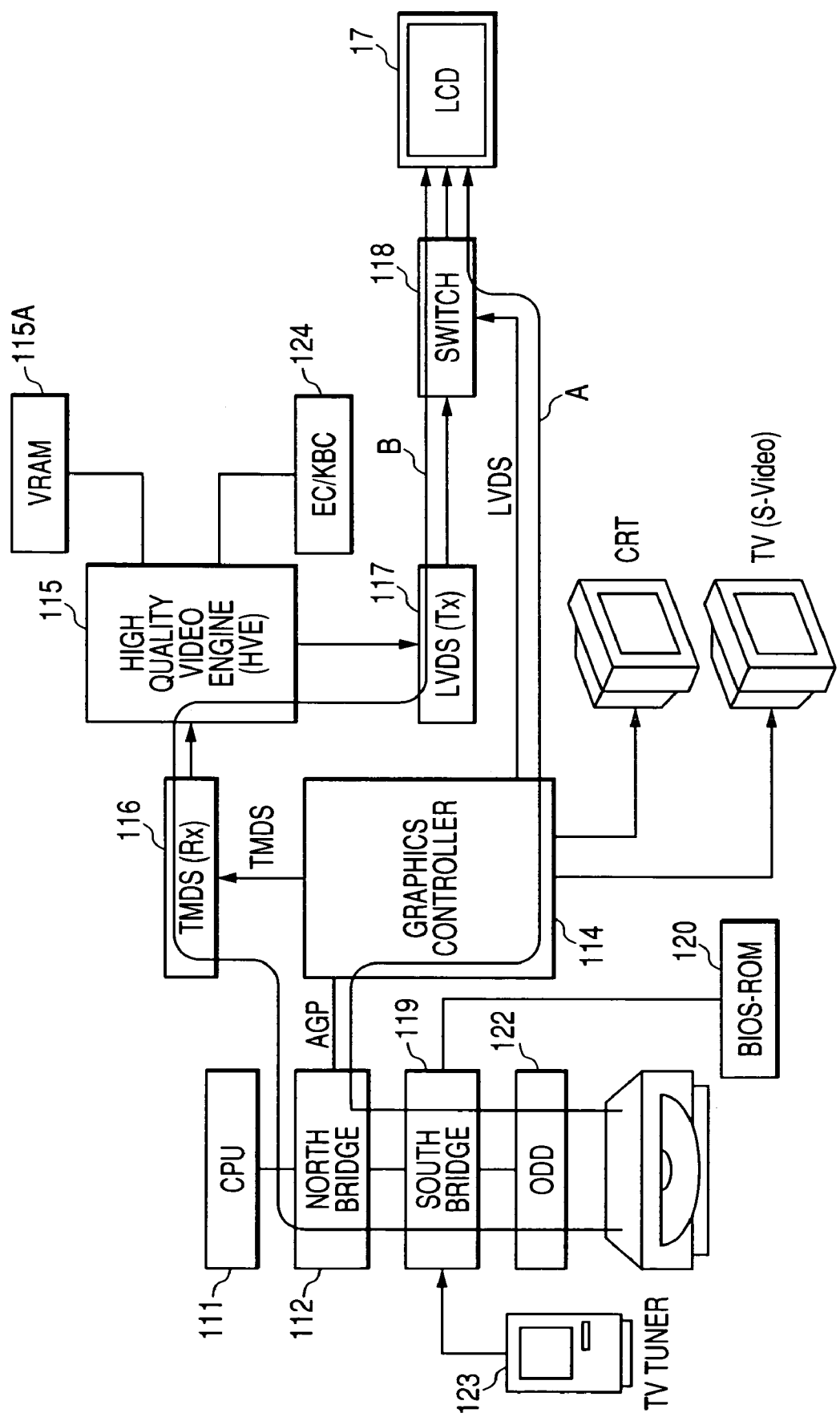
FIG. 8 is a view for explaining a flow of the video signal in each of a normal mode and a high quality mode used in the computer depicted in FIG. 1.

FIG. 8 shows a transfer path of motion picture data in each of the normal mode and the high quality mode. In FIG. 8, the case where motion picture data stored in a DVD medium are displayed on the LCD 17 is assumed.

In the normal mode, the motion picture data to be played back from the DVD medium by the ODD 122 are sent to the LCD 17 via the south bridge 119, the north bridge 112, the graphics controller 114 and the switch 118 as represented by the solid line A in FIG. 8. In the graphics controller 114, a video signal corresponding to the current display image is generated. Because the current display mode of motion picture data is not a full screen mode, for example, a video signal corresponding to the display image containing a still image such as a desk-top screen and a motion picture to be played back from the DVD medium is generated. When, for example, the panel resolution of the LCD 17 is 1280×800, the resolution of the video signal generated by the graphics controller 114 is also 1280×800. The video signal is sent to the LCD 17 without interposition of the high quality video engine (HVE) 115.

In the high quality mode, motion picture data to be played back from the DVD medium by the ODD 122 are sent to the LCD 17 via the south bridge 119, the north bridge 112, the graphics controller 114, the TMDS (Rx) processing portion 116, the high quality video engine (HVE) 115, the LVDS (Tx) processing portion 117 and the switch 118 as represented by the solid line B in FIG. 8. In the graphics controller 114, a video signal corresponding to the current display image is generated. Because the current display mode of motion picture data is a full screen mode, a video signal corresponding to the display image containing only a motion picture is generated. The resolution of the video signal is equal to the resolution (720×480 or 720×576) of raw data played back from the DVD medium. The video signal is sent to the LCD 17 after the quality of the video signal is corrected by the high quality video engine (HVE) 115 and the resolution of the video signal is enlarged to a resolution (e.g. 1280×800) for displaying the motion picture data in a full screen mode, by the scaling process.

In this manner, in this embodiment, the video signal is sent to the LCD 17 with interposition of the high quality video engine (HVE) 115 only in the case where the display mode of motion picture data is a full screen mode. Because the scaling process portion 203 is included in the high quality video engine (HVE) 115, nonlinear scaling is always applied to only motion picture data so that nonlinear scaling can be prevented from being applied to graphics data. In addition, the user can designate either nonlinear scaling mode or linear scaling mode. Accordingly, motion pictures can be displayed in a display format corresponding to user's preference without lowering of visibility of a still image.

Figure 9:
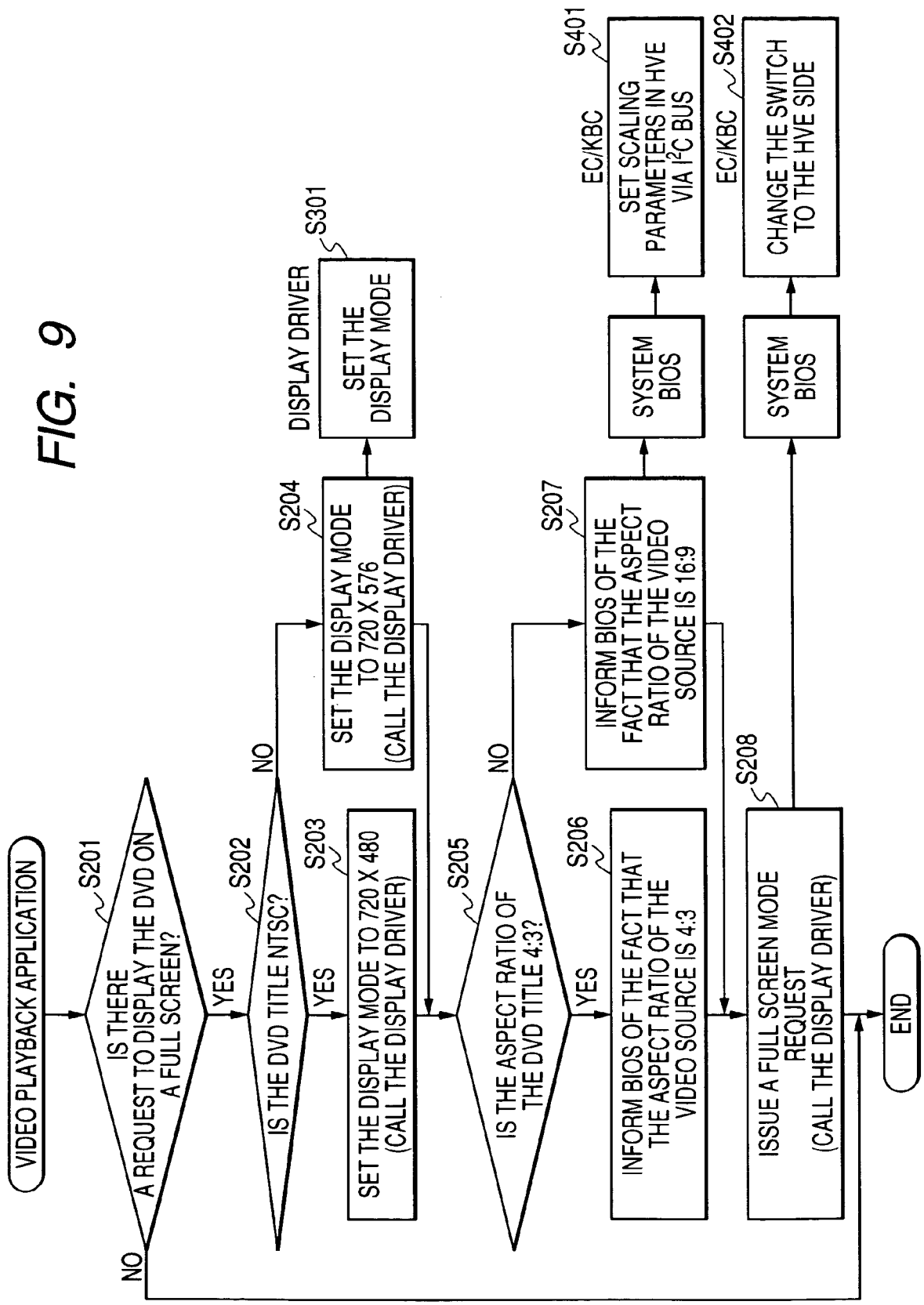
FIG. 9 is a flow chart showing a specific example of the display control process executed in the computer depicted in FIG. 1.

Next, an example of a procedure for a series of display control processes executed to display motion picture data will be described with reference to FIG. 9 which is a flow chart. The case where motion picture data stored in a DVD medium are displayed on the LCD 17 is assumed here.

The video playback application program starts a process for playing back motion picture data (DVD title) stored in the DVD medium. When, for example, a full screen mode (full screen display) is designated by the user's operation on the keyboard 13 or touch pad 16 in the middle of playback of motion picture data (YES in step S201), the video playback application program reads information indicating which of NTSC (National Television System Committee) Standard and PAL (Phase Alternation by Line) Standard corresponds to the played-back DVD title (video source) from the DVD medium.

If the DVD title corresponds to NTSC Standard (YES in step S202), the video playback application program requests the display driver to set a display mode corresponding to the resolution of 720×480 (step S203). On the other hand, if the played-back DVD title corresponds to PAL Standard (NO in step S202), the video playback application program requests the display driver to set a display mode corresponding to the resolution of 720×576 (step S204).

The display driver sets the graphics controller 114 to the display mode (720×480 or 720×576) designated by the video playback application program (step 301). Generally, the graphics controller 114 is set to a display mode corresponding to the panel resolution (1280×800). Accordingly, the resolution of the video signal generated by the graphics controller 114 is switched from 1280×800 to 720×480 or 720×576 by the step S301.

Then, the video playback application program reads title information indicating the aspect ratio of motion picture data of the played-back DVD title from the DVD medium. If the aspect ratio of motion picture data of the played-back DVD title is 4:3 (YES in step S205), the video playback application program executes a process for informing the system BIOS of the fact that the aspect ratio of motion picture data is 4:3 (step S206).

If the aspect ratio of motion picture data of the played-back DVD title is 16:9 (NO in step S205), the video playback application program executes a process for informing the system BIOS of the fact that the aspect ratio of motion picture data is 16:9 (step S207).

In each of steps S206 and S207, scaling parameters adapted to the aspect ratio of the played-back DVD title, the resolution of the DVD title and the scaling mode (nonlinear scaling/linear scaling) designated by the user are set as scaling parameters in the scaling register 204 of the high quality video engine (HVE) 115 by the system BIOS via the EC/KBC 124 and the I²C bus (step S401).

Then, for example, the video playback application program issues a full screen mode request to the display driver to thereby request the display driver to switch the display mode of motion picture data to a full screen mode (step S208). The system BIOS is informed of an event indicating the issue of the full screen mode request through the display driver. The EC/KBC 124 is also informed of this event through the system BIOS. The EC/KBC 124 executes a process for changing the switch 118 to the high quality video engine (HVE) 115 side on the basis of the switch control signal SW (step S402). The display driver controls the graphics controller 114 to switch the display mode of motion picture data to a full screen mode. As a result, the graphics controller 114 generates a video signal corresponding to only motion picture data from the motion picture data written in the video memory of the graphics controller 114 by the video playback application program. The video signal has the resolution designated by the step S203 or S204. The video signal generated by the graphics controller 114 is sent to the high quality video engine (HVE) 115. After the quality of the video signal is corrected, the video signal is scaled. The video signal thus subjected to the quality correction and the scaling is sent to the LCD 17 via the switch 118.

Figure 10:
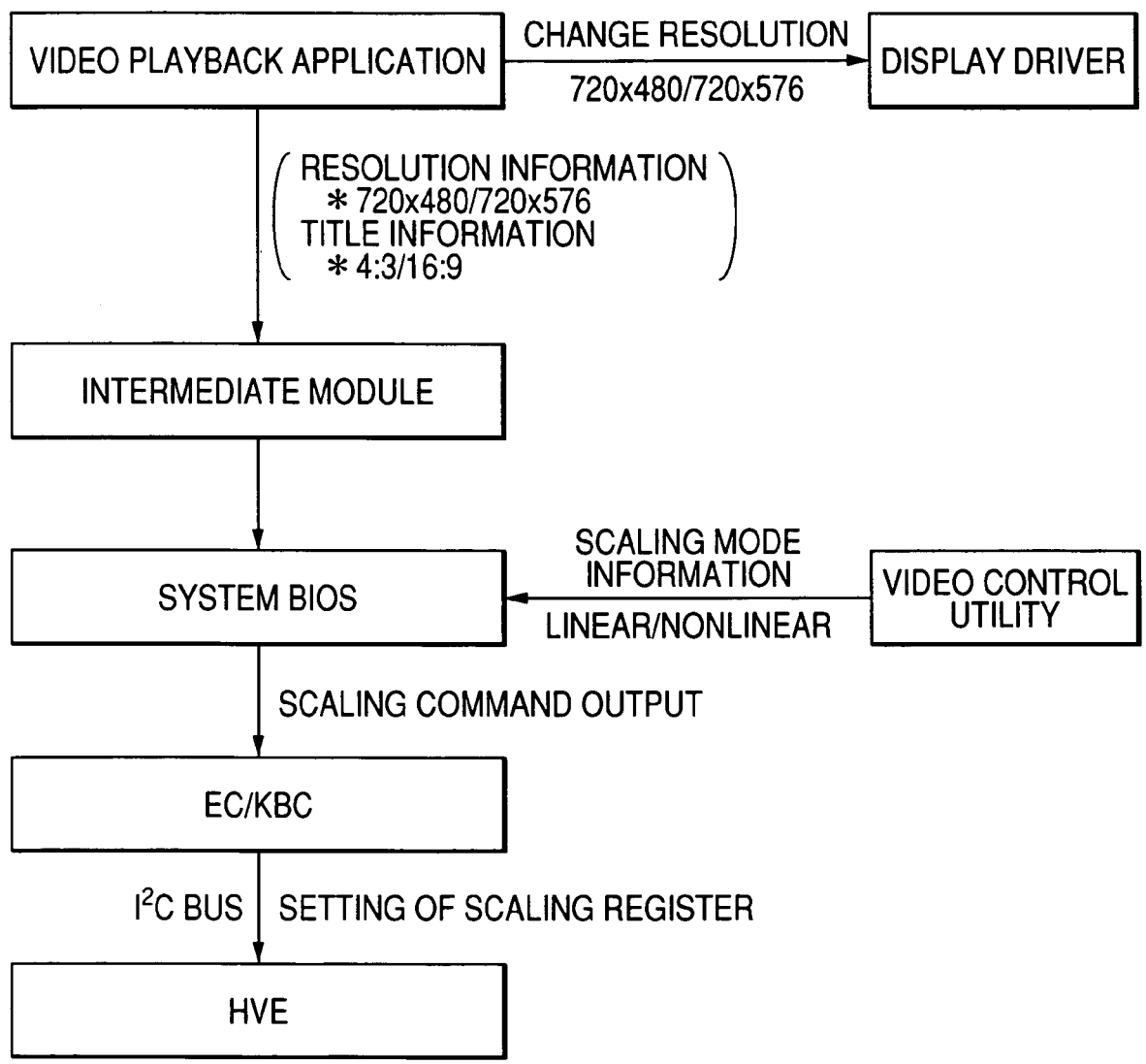
FIG. 10 is a view showing an example of interface for setting scaling parameters in the high quantity video engine provided in the computer depicted in FIG. 1.

FIG. 10 shows an example of interface for setting scaling parameters in the high quality video engine (HVE) 115.

The video playback application program informs the system BIOS of the resolution information (720×480/720×576) and title information (4:3/16:9) of the played-back DVD title through an intermediate module such as a library. The system BIOS acquires, form the video control utility, information (scaling mode information) indicating the scaling mode (nonlinear scaling/linear scaling) designated by the user using the video control utility and sends a scaling command containing the resolution information, the title information and the scaling mode information as arguments to the EC/KBC 124. The EC/KBC 124 calculates scaling parameters ($V_1$, $X_1$ to $X_n$, and $H_1$ to $H_n$) corresponding to the resolution, aspect ratio and scaling mode of motion picture data and sets the scaling parameters in the scaling register 204 of the high quality video engine (HVE) 115.

Figure 11:
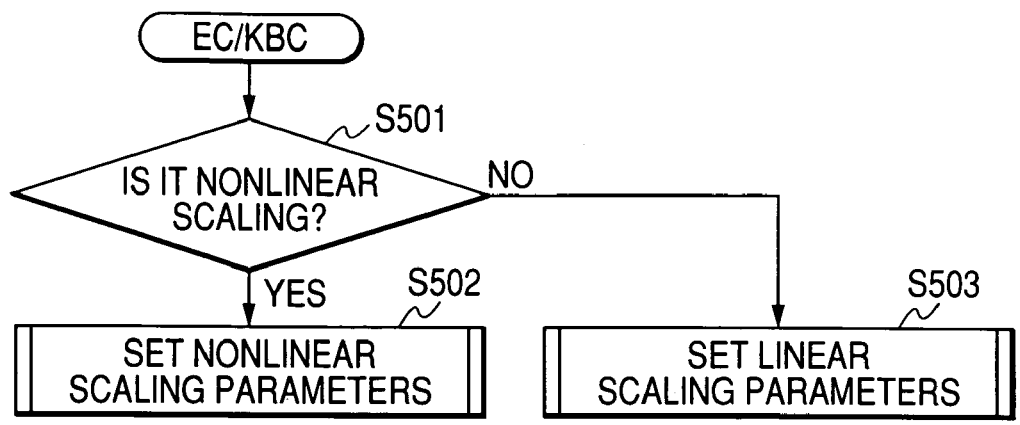
FIG. 11 is a flow chart for explaining a procedure for setting scaling parameters in the high quantity video engine provided in the computer depicted in FIG. 1.

The EC/KBC 124 has a parameter table for nonlinear scaling, and a parameter table for linear scaling. That is, as shown in FIG. 11, the EC/KBC 124 judges whether the scaling mode is a nonlinear scaling mode or a linear scaling mode (step S501). If the scaling mode is a nonlinear scaling mode (YES in step S501), the EC/KBC 124 generates scaling parameters ($V_1$, $X_1$ to $X_n$ and $H_1$ to $H_n$) for nonlinear scaling by searching the nonlinear scaling parameter table with the resolution and aspect ratio of motion picture data as indices and sets the scaling parameters ($V_{1,1}$ to $X_n$ and $H_1$ to $H_n$) in the scaling register 204 (step S502). On the other hand, if the scaling mode is a linear scaling mode (NO in step S501) the EC/KBC 124 generates scaling parameters ($V_1$, $X_1$ to $X_n$ and $H_1$ to $H_n$) for linear scaling by searching the linear scaling parameter table with the resolution and aspect ratio of motion picture data as indices and sets the scaling parameters ($V_1$, $X_1$ to $X_n$ and $H_1$ to $H_n$) in the scaling register 204 (step S503).

Next, a specific example of the scaling process will be described with reference to FIGS. 12 to 15.

Motion picture data corresponding to NTSC Standard are formed from frames with the resolution of 720×480 regardless of whether the aspect ratio is 4:3 or 16:9. With respect to frames corresponding to 16:9 motion picture data, each picture is compressed horizontally in advance so that a normal image can be displayed when the frame is scaled in the ratio of 16:9.

Figure 12:
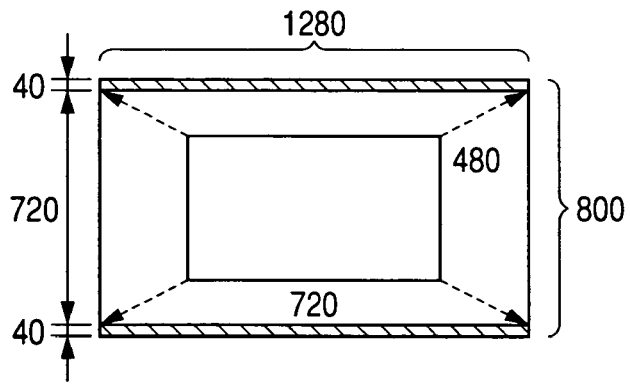
FIG. 12 is a view showing an example of the scaling process executed by the computer depicted in FIG. 1.

FIG. 12 shows an example of 16:9 motion picture data scaled in a linear screen mode. That is, when the aspect ratio of motion picture data is 16:9, each frame with the resolution of 720×480 is scaled to 1280×720 so that the aspect ratio is kept 16:9. Blank regions are formed on upper and lower sides of the 1280×720 frame. There is no image displayed in the blank regions.

Figure 13:
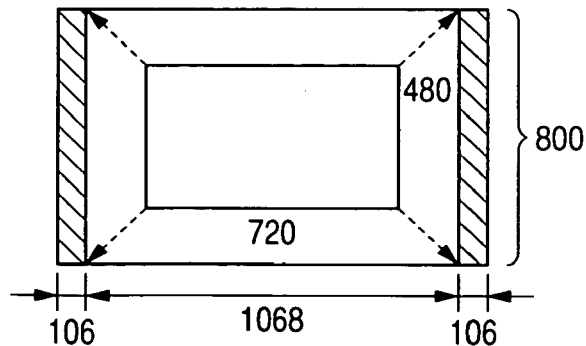
FIG. 13 is a view showing another example of the scaling process executed by the computer depicted in FIG. 1.

FIG. 13 shows an example of 4:3 motion picture data scaled in a linear screen mode. That is, when the aspect ratio of motion picture data is 4:3, each frame with the resolution of 720×480 is scaled to 1068×800 so that the aspect ratio is kept 4:3. Blank regions are formed on left and right sides of the 1068×800 frame. There is no image displayed in the blank regions.

Figure 14:
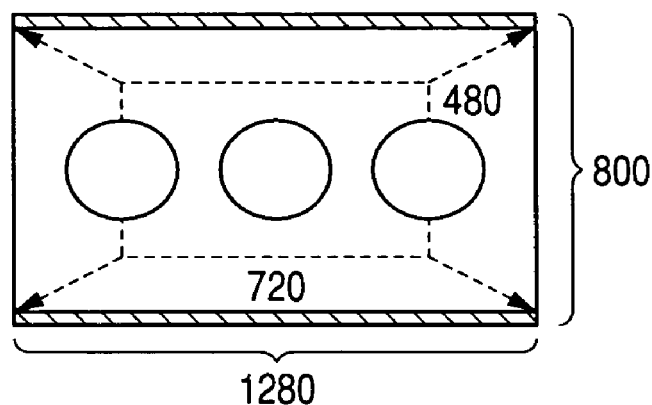
FIG. 14 is a view showing a further example of the scaling process.

FIG. 14 shows an example of 4:3 motion picture data enlarged to 1280 equal to the horizontal size of the LCD 17 in a uniform horizontal enlargement ratio. In this case, each motion picture is evenly enlarged horizontally as a whole.

Figure 15:
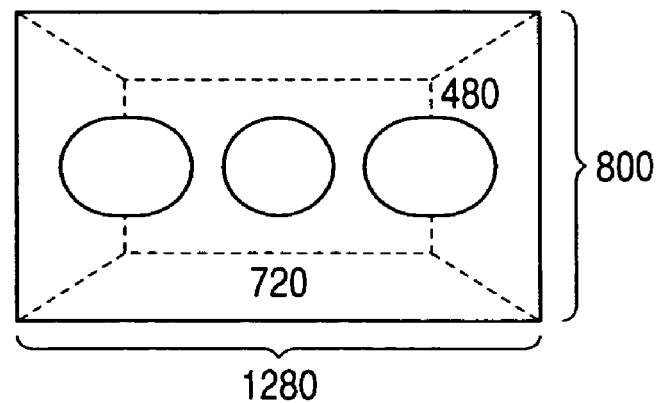
FIG. 15 is a view showing a further example of the scaling process executed by the computer depicted in FIG. 1.

FIG. 15 shows an example of 4:3 motion picture data scaled in a nonlinear screen mode. The horizontal enlargement ratio in the most significant center region coincides with the vertical enlargement ratio. For this reason, the video is powerfully spread to the whole of the screen size 1280×800 of the LCD 17 as well as the center region of the screen is not enlarged horizontally. Although the left and right ends of the screen are enlarged horizontally more intensively than those in FIG. 14, the horizontal enlargement is generally inconspicuous because the significance of the left and right ends is low in the case of motion pictures.

As described above, in this embodiment, only in the case where motion picture data are displayed in a full screen mode, scaling of the video signal is executed automatically in either linear scaling mode or nonlinear scaling mode designated by the user. Accordingly, even in the case where the user designates a nonlinear scaling mode in advance, the scaling process is not executed when a still image such as a text image or a graphics image is contained in the video signal. Accordingly, occurrence of a fault can be surely prevented from being caused by application of the nonlinear scaling process to the still image, so that nonlinear scaling and linear scaling can be selectively used for motion picture display without lowering of visibility of the still image.

Moreover, because the quality correcting process is executed for the video signal only in the case where motion picture data are displayed in a full screen mode, the quality of only motion pictures can be improved without lowering of visibility of the still image.

Incidentally, the invention is not limited to the aforementioned embodiment and constituent members of the embodiment can be modified in a practical stage without departing from the gist of the invention. The constituent members disclosed in this embodiment can be combined suitably to form various inventions. For example, several constituent members may be removed from the all constituent members disclosed in this embodiment. In addition, constituent members in different embodiments may be combined suitably.

What is claimed is:

1. An information processing apparatus comprising:
   a display device capable of displaying motion picture data;
   a display control portion which generates a video signal to form a display image to be displayed on the display device;
   a video processing portion which adjusts a quality of the video signal generated by the display control portion and scales a size of the video signal generated by the display control portion in either one of a linear scaling mode and nonlinear scaling mode; and
   a control unit which sets a display control mode for sending the video signal to the display device as a first mode for sending the video signal to the display device with interposition of the video processing portion when the quality of the video signal generated by the display control portion is adjusted, and the control unit which sets the display control mode for sending the video signal to the display device as a second mode for sending the video signal to the display device without interposition of the video processing portion when the quality of the video signal generated by the display control portion is not adjusted.

2. An information processing apparatus according to claim 1, further comprising:
  a judgment unit which judges whether display mode for displaying the motion picture data is a full screen mode or not; and
  wherein the video processing portion enlarges the size of the video signal generated by the display control portion, and the control unit sets the display control mode as the first mode when the display mode is judged as the full screen mode, and the control unit sets the display control mode as the second mode when the display mode is not judged as the full screen mode.

3. An information processing apparatus according to claim 2, wherein the judgment unit includes:
  a unit which judges that the display mode is the full screen mode, in response to a request designating the full screen mode which is issued from an application program for playing back the motion picture data.

4. An information processing apparatus according to claim 1, further comprising:
  a receiver which receives broadcast program data, wherein the motion picture data are broadcast program data received by the receiver.

5. An information processing apparatus according to claim 1, further comprising:
  a drive unit which drives a storage medium, wherein the motion picture data are data reproduced from the storage medium by the drive unit.

6. A display control method for displaying motion picture data on a display device of an information processing apparatus, the information processing apparatus including a display control portion which generates a video signal to form a display image to be displayed on the display device, and a video processing portion which adjusts the video signal generated by the display control portion and scales a size of the video signal generated by the display control portion in either one of a linear scaling mode and a nonlinear scaling mode, the display control method comprising:
  designating either one of the linear scaling mode and the nonlinear scaling mode as a scaling mode to be used by the video processing portion;
  setting a display control mode for sending the video signal to the display device as a first mode for sending the video signal to the display device with interposition of the video processing portion when the quality of the video signal generated by the display control portion is adjusted; and
  setting the display control mode as a second mode for sending the video signal to the display device without interposition of the video processing portion when the quality of the video signal generated by the display control portion is not adjusted.

7. A display control method according to claim 6, further comprising judging whether or not display mode for displaying the motion picture data is full screen mode;
  wherein the setting sets the display control mode as the first mode when the display mode is judged as the full screen mode, and the setting sets the display control mode as the second mode when the display mode is not judged as the full screen mode.

8. A display control method according to claim 7, wherein whether or not the display mode for displaying the motion picture data is the full screen mode is judged in response to a request designating the full screen mode issued from an application program for playing back the motion picture data.

9. A display control method according to claim 6, wherein the information processing apparatus further includes a receiver which receives broadcast program data, and
  wherein the motion picture data are broadcast program data received by the receiver.

10. A display control method according to claim 6, wherein, the information processing apparatus further includes a drive unit which drives a storage medium, and
  wherein the motion picture data is a data reproduced from the storage medium by the drive unit.

11. An information processing apparatus comprising:
  a display device capable of displaying motion picture data;
  a display control portion which generates a video signal to form a display image to be displayed on the display device;
  a unit which designs either one of a linear scaling mode and a nonlinear scaling mode as a scaling mode for enlarging the motion picture data;
  a video processing portion which enlarges a screen size of the video signal generated by the display control portion in the designated mode;
  a judgment unit which judges whether display mode for displaying the motion picture data is a full screen mode or not; and
  a control unit which sets a display control mode for sending the video signal to the display device as a first mode for sending the video signal to the display device with interposition of the video processing portion when the display mode is judged as the full screen mode, and the control unit which sets the display control mode for sending the video signal to the display device as a second mode for sending the video signal to the display device without interposition of the video processing portion when the display mode is not judged as the full screen mode.

12. An information processing apparatus according to claim 11, wherein the video processing portion includes a quality adjustment portion which adjusts a quality of the video signal before the screen size of the video signal is enlarged.

13. An information processing apparatus according to claim 11, wherein the judgment unit includes:
  a unit which judges that the display mode is the full screen mode, in response to a request designating the full screen mode which is issued from an application program for playing back the motion picture data.

* * * * *